United States Patent [19]

Ip

[11] Patent Number: 4,891,640
[45] Date of Patent: Jan. 2, 1990

[54] HIGH TEMPERATURE AND PRESSURE FIBER OPTIC FEEDTHROUGH FOR BOREHOLE USAGE

[75] Inventor: Matthew Ip, Austin, Tex.

[73] Assignee: Halliburton Logging Services, Inc., Houston, Tex.

[21] Appl. No.: 266,185

[22] Filed: Nov. 3, 1988

[51] Int. Cl.$^4$ ............................................. G02B 6/38
[52] U.S. Cl. .................................. 340/853; 350/96.2; 350/96.21
[58] Field of Search ............... 350/96.15, 96.17, 96.2, 350/96.21, 96.22; 340/850, 853, 856; 367/81, 82, 76; 250/227; 356/241

[56] References Cited

U.S. PATENT DOCUMENTS

| | | | |
|---|---|---|---|
| 4,184,741 | 1/1980 | Hawk et al. | 350/96.2 |
| 4,682,848 | 7/1987 | Cairns et al. | 350/96.21 |
| 4,759,601 | 7/1988 | Kautsen et al. | 350/96.2 |

Primary Examiner—Brian S. Steinberger
Attorney, Agent, or Firm—William J. Beard

[57] ABSTRACT

A high temperature and high pressure fiber optic feedthrough is set forth to enable communication to the interior of a pressure housing making up a downhole logging tool. An optical fiber is stripped of protective wraps and coverings other than a fluorocarbon coating. It is inserted into a feedthrough fitting formed of an elongate body that feeds to the pressure housing. There is an axial bore which has an internal cavity at the upper end. This cavity receives a conic section of a resilient body which is deformable. Through the use of a specially designed syringe, the optical fiber is passed through this cavity and is positioned on the interior bore of the body. The resilient material is able to expand on application of pressure. The cavity is closed by means of a retainer nut and wear washer. When the nut is tightened, the resilient material extrudes around and along the optical fiber and seals against it to perfect a high pressure, high temperature seal against the intrusion of well fluids.

3 Claims, 1 Drawing Sheet

U.S. Patent
Jan. 2, 1990
4,891,640
FIG.1
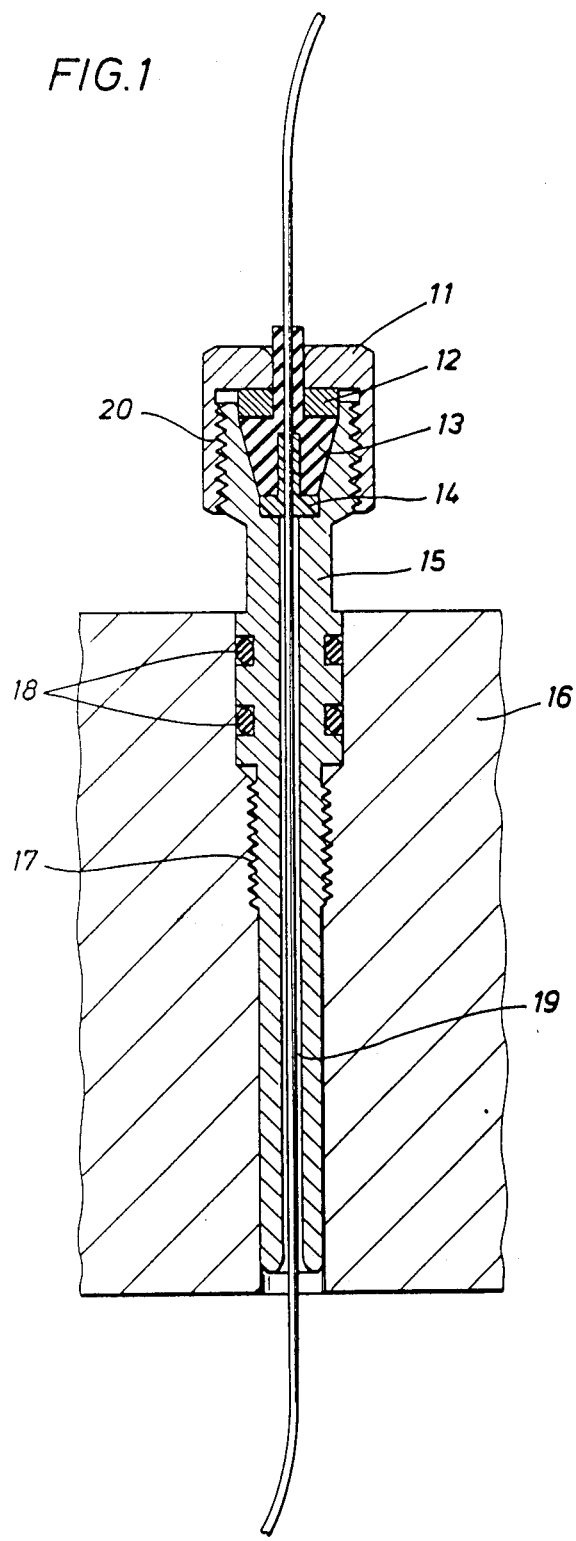
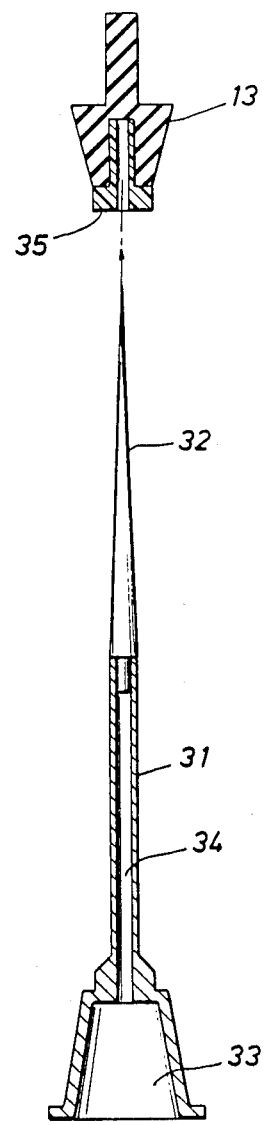
FIG. 2

HIGH TEMPERATURE AND PRESSURE FIBER OPTIC FEEDTHROUGH FOR BOREHOLE USAGE

FIELD OF THE INVENTION

This invention relates to well logging and more particularly to a well logging system incorporating a fiber optic logging cable for use in well boreholes.

BACKGROUND OF THE INVENTION

Modern well logging systems have called for wider band widths in logging cable for communicating data both to and from a downhole well logging tool to the surface equipment located in a truck. Such fiber optic cables have been in use in surface communication systems for several years and can provide band widths of hundreds of megahertz for the transmission of data in both analog and digital form.

For borehole usage, however, armored logging cables employing multiple electrical conductors have long been in use and equipment in downhole well logging instruments sometimes requires large electrical currents for operation. The electrical conductors in such logging cables have heretofore been abundantly capable of providing both communication paths and power paths from the surface to the downhole instrumentation.

However, the need for band widths on the order of tens of megahertz in order to send digital data from downhole instruments to the surface and vice versa has led to the development of logging cables employing both electrical conductors and fiber optic transmission lines. Since water is the enemy of fiber optics, special means must be employed to hermetically seal the optical fibers used in the well logging environment from the encroachment of water from the borehole and surrounding earth formations. This becomes particularly critical when the logging cable is subjected to the extremely high temperatures and pressures present in a well borehole to a depth of 25,000 feet. In such environments, depending upon mud weight and downhole temperatures, temperatures can reach the vicinity of 400° to 500° F. and pressures reach the vicinity of 20 to 25,000 pounds per square inch.

It is apparent that feeding electrical conductors from the logging cable into the interior of a well logging instrument is a problem which was long ago solved by the industry. However, the feedthrough from a high pressure external environment to a low pressure internal environment in a well logging tool is a new problem limiting the use of fiber optic logging cable in the borehole. A connector which is practical from a field handling perspective is required, especially one which can preserve the integrity of the interior of the well logging instrument from the extremely high pressures and the high temperatures found in well boreholes.

SUMMARY OF THE INVENTION

In the present invention, a fiber optic feedthrough is provided in which an elastomeric material forms a seal against the fluorocarbon (Teflon) coating surrounding the hermetically sealed optical fiber or fibers employed in a well logging cable. Teflon is a mark of the DuPont Company. A mechanical apparatus for providing the seal between the Teflon coating surrounding the fiber and the other component parts of the feedthrough connector is also disclosed. Because of the extremely small size of the fiber optic which is employed in the well logging cable, a special insertion instrument must be utilized in order to feed the optical fiber through the feedthrough connector employed in the present invention. This special instrument makes possible the use of the connector of the present invention under field conditions.

The above and other features and advantages of the present invention are best understood when taken in conjunction with the accompanhying drawings in the following detailed description of the invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustreated in the appended drawings.

It is to be noted, however, that the appended drawings illustrate only typical embodiments of this invention and are therefore not to be considered limiting of its scope, for the invention may admit to other equally effective embodiments.

In the Drawings;

FIG. 1 is a schematic diagram illustrating the high pressure fiber optic feedthrough according to the concepts of the present invention.

FIG. 2 is a schematic drawing illustrating a special tool used with the connector FIG. 1 for the insertion of the optical fiber therethrough.

DESCRIPTION OF THE PREFERRED EMBODIMENT

The present invention deals with the problem of passing an optical fiber from a high pressure to the low pressure side of a well logging instrument in a well borehole environment. The feedthrough connector according to the concepts of the present invention is employed at a surrounding tool housing (not shown), and for ease of illustration and explanation, it is illustrated with respect to only one optical fiber. it will be understood by those skilled in the art that multiple pin connectors such as that shown in the present invention could be employed to conduct several optical fibers through a logging tool housing from a high pressure side to a low pressure side and still be in accordance with the concepts of the present invention.

Referring now to FIG. 1, the feedthrough connector body 15 is illustrated as an elongate, vertical form having a threaded connection portion 17 for threadedly engaging a tool housing or body 16. The connector body 15 is sealed in a conventional manner against the tool body by the use of multiple O-ring seals 18 as illustrated. While only two such O-ring seals are shown in FIG. 1, more than two may be employed if desired. This provides fluid tight integrity between the fiber optic connector body 15 and the well logging tool body 16.

The connector body has an elongate bore 19 passing through its entire length. This bore 19 is sized to receive a fiber optic member which is suitable for use in a well logging cable provided this optical fiber has been stripped of all protective coatings extruded hydrocarbon plastics, etc.; a fiber deposited coating comprising a high temperature fluorocarbon such as that sold under the trademark of Teflon by the Dupont Company is left on the fiber. The actual glass optical fiber is too delicate to handle without the Teflon protective coating over its exterior surface. The Teflon coating a hermetic seal coating which may be of a metallic oxide or the liked but which is not the subject of the present invention. The seal coating and the external coating are relatively thin and are not separately illustrated in FIG. 1.

A retaining nut 11 is threadedly connected by the threaded connection 20 to the connector body 15. The retaining nut 11 is provided with a bore coaxial with the bore 19 passing through the connector body 15 and which is sized to receive the optical fiber and a surrounding extruded stem of an elastomeric sealing material 13. A support 14 for the molded elastomer seal gland 13 is provided on the bottom of a shallow cavity set into the connector body 15. The molded elastomer seal gland 13 may comprise for example, a high temperature rubber compound such as Buna-N or butadiene which may be compressed in its resilient form while retaining its integrity at the high temperatures and pressure present in a well bore hole.

The threaded connection of the retaining nut 11 onto the body member 15 forces the wear washer 12 down against the elastomer seal material 13 which is compressed between the wear washer 12 and the elastomer support member 14; molded gland includes an upwardly extending conformed portion in the bore in the retaining nut 11 surrounding the optical fiber passing through the elastomer seal material. Further compression of the retaining nut provides a tighter and hence stronger seal between the elastomeric sealing material 13 and the Teflon coating surrounding the optical fiber. On tightening the components during assembly, the washer 12 is not round; it is preferably keyed to the body 15 to prevent torque transfer during tightening of the retainer nut 11.

In order to introduce the optical fiber through the elastomer seal material 13 and through the bore 19 passing through the connector body member 15, a special purpose tool is illustrated in FIG. 1. A modified hypodermic syringe 31 capable of receiving a piercing needle 32 is illustrated in FIG. 2. The needle 32 is inserted in the end of the bore and retained therein by friction for the purpose of introducing the optical fiber into the connector of FIG. 1. In operation, the molded elastomer seal gland 13 is inserted around a modified elastomer support 35. This modified elastomer support has a bigger internal bore diameter than the regular elastomer support 14 to allow the OD of the hypodermic syringe needle 32 to pass through. The needle 32 of the syringe 31 is inserted through the bore from the bottom of the modified elastomer support 35 and upward through the molded elastomer seal gland 13. Once the needle 32 has pierced through the top of the elastomer seal 13, the needle 32 is removed to leave the syringe 31 positioned to permit fiber installation.

The fiber from the well logging cable is then stripped from all protective wrappings to expose bare fiber with its Teflon protection wrapping or layer. The fiber is then inserted through the bore in the retaining nut 11 and wear washer 12, respectively, and through the syringe exposed above the molded elastomer seal gland 13 and into the bore of the connector body 35, exposing the fiber below the modified elastomer support 35. The modified elastomer support is then removed from the molded elastomer seal gland 13 and replaced with the actual elastomer support. With the connector body 15 already installed in the tool body 16 the fiber from the above assembly is guided through the bore of the connector body 15. The needle is used to guide the fiber through the bore 19. the hypodermic tool is then removed and the retainer nut 11 is then tightened compressing the elastomer seal material 13 between the wear washer 12 and the elastomer support member 14. This compresses the elastomer seal material 13 against the Teflon coating surrounding the optical fiber and the wear washer 12 and the retainer nut 11 thus forming the high temperature, high pressure fluid tight seal about the optical fiber.

The foregoing descriptions may make other alternative arrangements according to the concepts of the invention apparent to those skilled in the art. It is therefore the aim of the appended claims to cover all such changes and modifications as would be made apparent to those skilled in the art.

What is claimed:

1. An optical feedthrough connector and tool for insertion into a tool housing suitable for use in a well borehole at pressures to 25,000 psi and temperatures to 450° F. with an optical fiber having an outer protective fluorocarbon coating, comprising:
   (a) an elongate connector body member having an upper end and a lower end and a connecting bore therethrough, said bore being sized to receive an optical fiber having an outer protective coating, said upper end of said connector body member having an elastomer retaining cavity therein;
   (b) a retaining nut member threadedly connected to the upper end of said connector body and having a bore therethrough in coaxial alignment with said connecting bore in said body member;
   (c) a wear washer sized to fit in the upper end of said cavity of said connector body member;
   (d) elastomer seal means disposed in said elastomer retaining cavity adjacent to an elastomer support means disposed at the lower end of said elastomer retaining cavity arranged so that, when said retaining nut member is tightened on said body member, said elastomer seal means is sealingly urged against the exterior of the optical fiber as said elastomer seal means is compressed between said wear washer and said elastomer support means to thereby form a sealing engagement between said elastomer seal means and the optical fiber; and
   (e) an insertion tool for inserting said fiber through said elastomeric sealing means and into said connecting bore, said insertion tool comprising a syringe having a funnel entry into a bore extending therethrough and a detachable needle means aligned with said bore, said bore being sized to receive the optical fiber.

2. The connector of claim 1 wherein said connector body member is provided with exterior threaded connection means for connection to a logging tool body member.

3. The connector of claim 2 and further including sealing means for sealingly connecting said connector body member to said logging tool body member.

* * * * *